United States Patent
Zhang et al.

(10) Patent No.: US 12,118,198 B2
(45) Date of Patent: Oct. 15, 2024

(54) OBJECT PROCESSING METHOD HAVING CUSTOMIZATION OPTIONS AND APPARATUS THEREOF

(71) Applicant: Beijing Bytedance Network Technology Co., Ltd., Beijing (CN)

(72) Inventors: Kai Zhang, Beijing (CN); Ying Song, Beijing (CN); Qing Guo, Beijing (CN); Chunyan Xia, Beijing (CN); Yu Sun, Beijing (CN); Qikang Ren, Beijing (CN); Jingjing Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/393,581

(22) Filed: Dec. 21, 2023

(65) Prior Publication Data

US 2024/0126421 A1    Apr. 18, 2024

Related U.S. Application Data

(63) Continuation of application No. PCT/CN2022/104568, filed on Jul. 8, 2022.

(30) Foreign Application Priority Data

Jul. 19, 2021    (CN) .......................... 202110815644.6

(51) Int. Cl.
*G06F 3/04847*    (2022.01)
*G06Q 30/0601*    (2023.01)

(52) U.S. Cl.
CPC ..... *G06F 3/04847* (2013.01); *G06Q 30/0621* (2013.01); *G06Q 30/0641* (2013.01)

(58) Field of Classification Search
CPC .................................................. G06F 3/04847
(Continued)

(56) References Cited

U.S. PATENT DOCUMENTS

| 6,904,565 B1 | 6/2005 | Lentz | |
|---|---|---|---|
| 2005/0015312 A1* | 1/2005 | Hoffman | G06Q 30/02 705/26.5 |

(Continued)

FOREIGN PATENT DOCUMENTS

| CN | 109034962 A | 12/2018 |
|---|---|---|
| CN | 109710070 A | 5/2019 |

(Continued)

OTHER PUBLICATIONS

International Search Report in PCT/CN2022/104568, mailed Sep. 20, 2022, 10 pages.

(Continued)

*Primary Examiner* — Long D Pham
(74) *Attorney, Agent, or Firm* — Astute IP Law Group

(57) ABSTRACT

An object processing method includes: displaying a first operation interface in response to triggering a first operation control of a first stage of a target object, the first operation interface including at least one first operation item; displaying a content input interface in response to completing an operation for the at least one first operation item, the content input interface including at least one input item; in response to completion of content input for the at least one input item, determining a second target value and generating a second operation control corresponding to a second stage of the target object; displaying a second operation interface in response to triggering the second operation control, the second operation interface including at least one second (Continued)

operation item; and updating the state of the target object to a completed state in response to completing an operation for the second operation item.

15 Claims, 11 Drawing Sheets

(58) Field of Classification Search
USPC .......................................................... 715/771
See application file for complete search history.

(56) References Cited

U.S. PATENT DOCUMENTS

| | | |
|---|---|---|
| 2010/0223153 A1 | 9/2010 | Sin |
| 2018/0293632 A1 | 10/2018 | Golub |
| 2018/0367484 A1* | 12/2018 | Rodriguez .............. H04L 51/10 |
| 2019/0114699 A1 | 4/2019 | Cook et al. |
| 2020/0184530 A1* | 6/2020 | Anderson .......... G06Q 30/0641 |
| 2022/0366470 A1* | 11/2022 | Johansson ............. G06T 19/006 |

FOREIGN PATENT DOCUMENTS

| | | |
|---|---|---|
| CN | 111062706 A | 4/2020 |
| WO | 2014087376 A1 | 6/2014 |

OTHER PUBLICATIONS

Extended European Search Report for European Application No. 22845163.9, mailed Feb. 2, 2024, 4 pages.

* cited by examiner

OBJECT PROCESSING METHOD HAVING CUSTOMIZATION OPTIONS AND APPARATUS THEREOF

The present application is a continuation of International Application No. PCT/CN2022/104568, filed on Jul. 8, 2022 which claims priority to Chinese Patent Application No. 202110815644.6, titled "OBJECT PROCESSING METHOD AND APPARATUS, DEVICE, MEDIUM, AND COMPUTER PROGRAM PRODUCT", filed on Jul. 19, 2021 with the China National Intellectual Property Administration, both of which are incorporated herein by reference in their entireties.

FIELD

The present disclosure relates to the technical field of computer communication, and in particular to an object processing method and apparatus, a device, a medium, and a computer program product.

BACKGROUND

In related technologies, the commodities provided by the network platforms are of uniform specifications and are produced in bulk. However, relevant Internet commodities cannot meet consumers' demand.

SUMMARY

An object processing method and apparatus, a device, a medium, and a computer program product are provided according to the present disclosure.

In a first aspect, an object processing method is provided according to the present disclosure. The method includes:
  displaying a first operation interface in response to triggering a first operation control in a first stage for a target object, where the first operation interface includes at least one first operation option, and the at least one first operation option corresponds to a first target value;
  displaying a content input interface in response to completing an operation on at least one first operation option in the first operation interface, where the content input interface includes at least one input option;
  determining a second target value and generating a second operation control corresponding to a second stage for the target object, in response to content inputted in the at least one input option;
  displaying a second operation interface in response to triggering the second operation control, where the second operation interface includes at least one second operation option, and the at least one second operation option corresponds to the second target value; and
  updating a state of the target object to a completed state in response to completing an operation on the at least one second operation option in the second operation interface.

In an embodiment, after displaying the content input interface in response to completing the operation on at least one first operation option in the first operation interface, the method further includes:
  displaying a third operation control within a first preset time period; and
  updating the state of the target object to a disabled state, in response to triggering the third operation control within the first preset time period.

In an embodiment, the determining the second target value and generating the second operation control corresponding to the second stage for the target object, in response to content inputted in the at least one input option includes:
  determining the second target value and generating the second operation control corresponding to the second stage for the target object, in response to inputting the second target value in a completion status input box.

In an embodiment, the method further includes: updating the state of the target object to the disabled state, in response to no second target value inputted in the completion status input box within a second preset time period.

In an embodiment, the content input interface is a conversational interface with a robot.

The method further includes: determining the content inputted in the at least one input option based on interaction content on the conversational interface with the robot.

In an embodiment, the determining the second target value and generating the second operation control corresponding to the second stage for the target object in response to the completion of the content inputted in the at least one input option includes:
  determining the second target value and generating the second operation control corresponding to the second stage for the target object in response to a completion of operations on target input options, where there is a one-to-one correspondence between the target input options and sub target values, and the second target value is a sum of sub target values.

In a second aspect, an object processing apparatus is provided according to the present disclosure. The apparatus includes a display module and an execution module.

The display module is configured to display a first operation interface in response to triggering a first operation control in a first stage for a target object, where the first operation interface includes at least one first operation option, and the at least one first operation option corresponds to a first target value, and display a content input interface in response to completing an operation on at least one first operation option in the first operation interface, where the content input interface includes at least one input option.

The execution module is configured to determine a second target value and generate a second operation control corresponding to a second stage for the target object, in response to content inputted in the at least one input option.

The display module is further configured to display a second operation interface in response to triggering the second operation control, where the second operation interface includes at least one second operation option, and the at least one second operation option corresponds to the second target value.

The execution module is further configured to update a state of the target object to a completed state in response to completing an operation on at least one second operation option in the second operation interface.

In an embodiment, the display module is further configured to display a third operation control within a first preset time period.

The execution module is further configured to update the state of the target object to a disabled state in response to triggering the third operation control within the first preset time period.

In an embodiment, the execution module is further configured to determine the second target value and generate the second operation control corresponding to a second stage for the target object, in response to inputting the second target value in a completion status input box.

In an embodiment, the execution module is further configured to update the state of the target object to the disabled state in response to no second target value inputted in the completion status input box within a second preset time period.

In an embodiment, the content input interface is a conversational interface with a robot.

The execution module is further configured to determine the content inputted in the at least one input option based on interaction content on the conversational interface with the robot.

In an embodiment, the execute module is further configured to determine the second target value and generate the second operation control corresponding to the second stage for the target object in response to a completion of operations on a target input option, where there is a one-to-one correspondence between the target input options and sub target values and the second target value is a sum of sub target values.

In a third aspect, an electronic device is provided according to the present disclosure. The electronic device includes a processor. The processor is configured to execute a computer program stored in a memory. The computer program, when executed by the processor, causes the processor to implement the method according to the first aspect.

In a fourth aspect, a computer-readable storage medium is provided according to the present disclosure. The computer-readable storage medium stores a computer program. The computer program, when executed by a processor, causes the processor to implement the method according to the first aspect.

In a fifth aspect, a computer program product is provided according to the present disclosure. The computer program product, when running on a computer, causes the computer to implement the method according to according to the first aspect.

BRIEF DESCRIPTION OF THE DRAWINGS

The drawings herein are incorporated into the specification and constitute a part of the specification and show embodiments of the present disclosure. The drawings and the specification are intended to explain the principle of the present disclosure.

In order to more clearly explain the embodiments of the present disclosure or the technical solutions in the conventional technology, the drawings used in the description of the embodiments or the conventional technology are briefly described below. Apparently, for those skilled in the art, other drawings may be obtained according to the provided drawings without any creative effort.

DETAILED DESCRIPTION OF EMBODIMENTS

Figure 1:
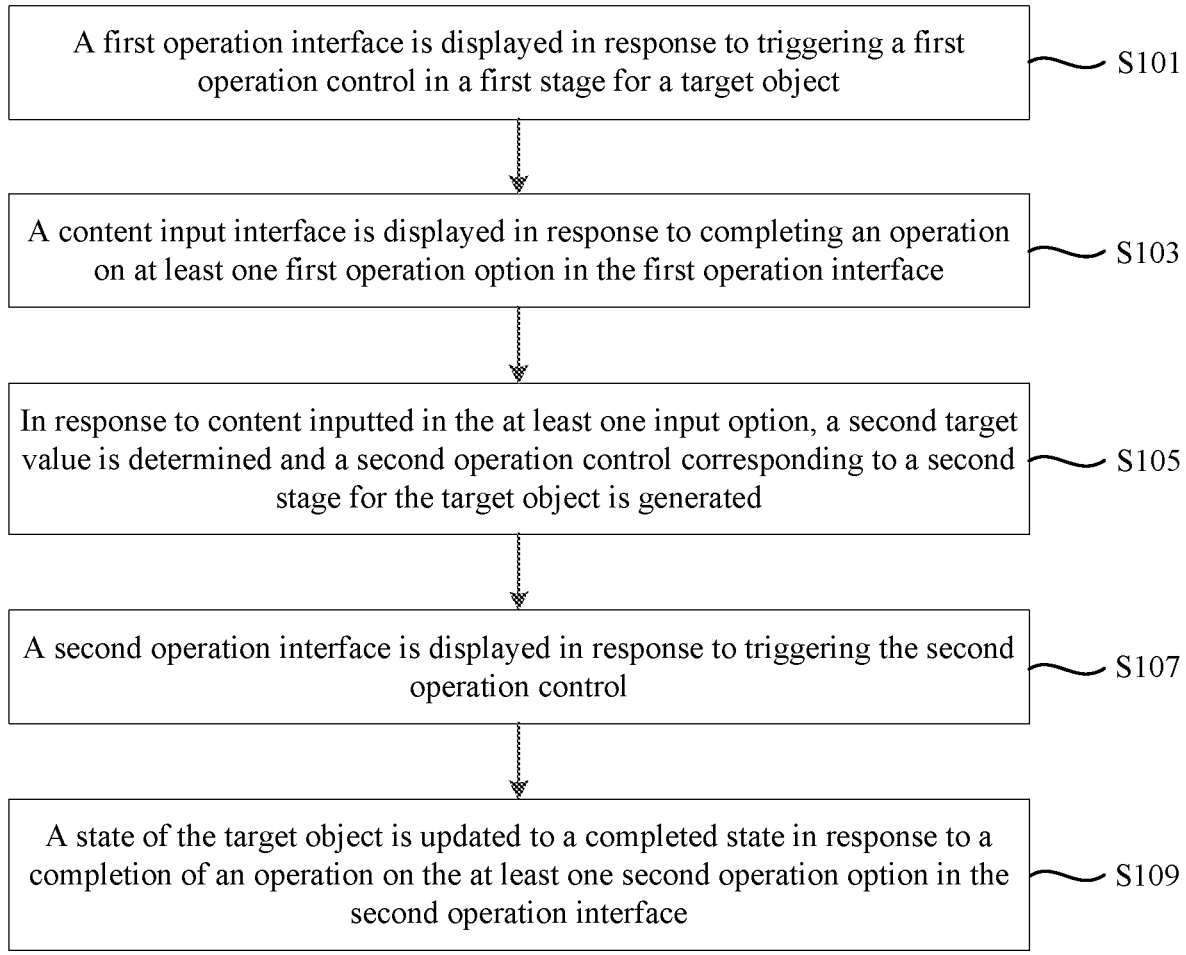
FIG. 1 is a flowchart of an object processing method according to the present disclosure.

In order to better understand the purposes, features, and advantages of the present disclosure, the solutions of the present disclosure are further described hereinafter. It should be noted that the embodiments of the present disclosure and the features in the embodiments may be combined with each other in a case of no conflict.

In the following description, numerous specific details are set forth in order to provide thorough understanding of the present disclosure. However, the present disclosure may be implemented in other ways different from those described here. Apparently, the embodiments in the specification are only a part of the embodiments of the present disclosure, rather than all the embodiments.

The technical solutions according to the present disclosure are applicable to a terminal device. The terminal device may be a smart electronic device such as a computer, a tablet, and a mobile phone. The terminal device is provided with a display screen. The display screen may be a touch screen or a non-touch screen. For a terminal device with a touch screen, a user may interact with the terminal device through a gesture, a finger, or a touch tool (for example, a stylus). For a terminal device with a non-touch screen, the user may interact with the terminal device through an external device such as a mouse or a keyboard.

In the present disclosure, a target object may be an order for a customized product. A first stage may be a deposit stage of the order for the customized product. In the deposit stage, the user needs to transfer a part of resources for ordering the customized product to the supplier. A second stage may be a balance stage of the order for the customized product. In the balance stage, the user needs to transfer a remaining part of resources for ordering the customized product. Through transferring the part of resources and the remaining part of resources, the user completes the transmission of the resources for ordering the customized product, and the user can obtain the customized product. In the present disclosure, a first operation interface may be a deposit interface, and a second operation interface may be a balance interface. In the present disclosure, a first operation control may be a control for triggering entry into the deposit interface, and a second operation control may be a control for triggering entry into the balance interface. In the present disclosure, a first target value may be a deposit of the customized product, and a second target value may be a balance of the customized product.

At least one first operation option in the present disclosure includes a deposit confirming option and a deposit canceling option. The deposit of the order for the customized product is given by completing an operation on the deposit confirming option, thereby enabling a user to reserve the customized product. A content input interface may be an input interface for inputting content of the order for the customized product. A merchant may input content in at least one input option on the content input interface based on customization demand of the user and attributes of the customized product. The merchant inputs different contents into various input options based on different customization demands of different users, to determine different customized products. In this way, different secondary target values are determined. That is, different customized products have different values.

At least one second operation option in the present disclosure includes a balance confirming option and a balance canceling option. The balance of the order for the customized product is given by completing an operation on the balance confirming option. In this case, the order for the customized product is in a completed state, which indicates that the user has already given the value corresponding to the customized product and the user can obtain the customized product.

It should be noted that names of interfaces and names of controls involved in the present disclosure are illustrative, and may be replaced with other names as along as an equivalent function can be achieved, which is not limited in the present disclosure.

The technical solutions according to the present disclosure are described below in conjunction with several embodiments.

FIG. 1 is a flowchart of an object processing method according to the present disclosure. As shown in FIG. 1, the method includes the following steps.

In step S101, a first operation interface is displayed in response to triggering a first operation control in a first stage for a target object.

The first operation interface includes at least one first operation option, and the at least one first operation option corresponds to a first target value.

Figure 2:
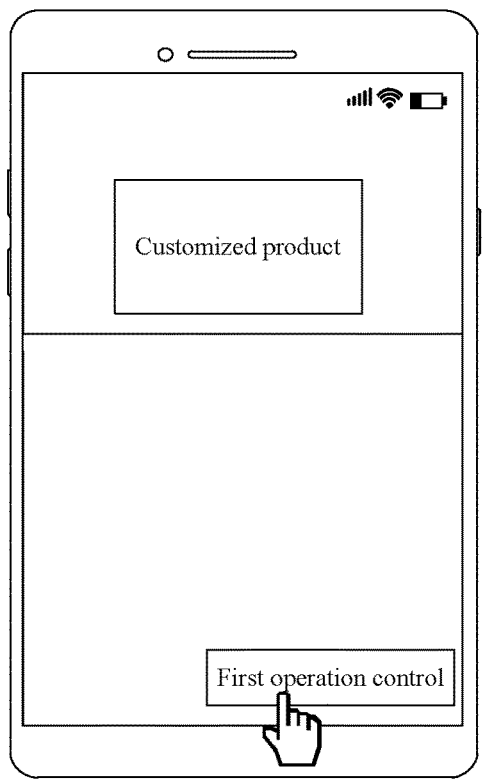
FIG. 2 is a schematic diagram of a display interface according to the present disclosure.
Figure 3:
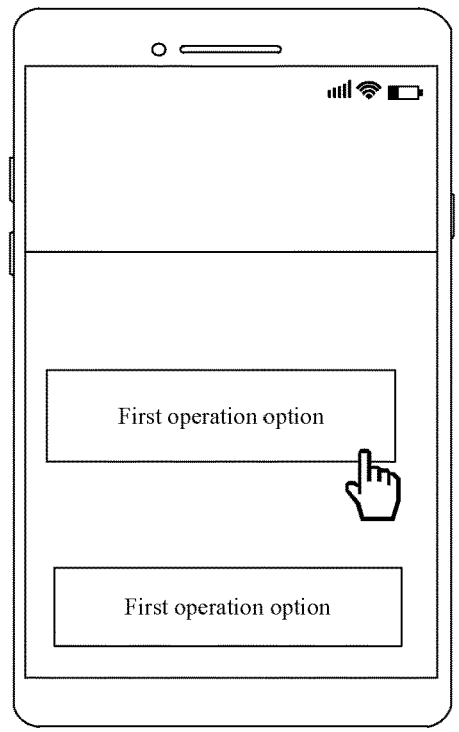
FIG. 3 is a schematic diagram of another display interface according to the present disclosure.

For example, FIG. 2 is a schematic diagram of a display interface according to the present disclosure, and FIG. 3 is a schematic diagram of another display interface according to the present disclosure. When a user wants to customize a product, a target object corresponding to the customized product is first generated. In the first stage for the target object, the user triggers the first operation control as shown in FIG. 2, and a first operation interface as shown in FIG. 3 is displayed in response to triggering the first operation control. At least one first operation option is displayed on the first operation interface. The at least one first operation option includes a deposit confirming option and a deposit canceling option. If the user completes an operation on the deposit canceling option, the target object is disabled and a process of obtaining the customized product is terminated. If the user completes an operation on the deposit confirming option, the customized product is reserved.

In step S103, a content input interface is displayed in response to completing an operation on at least one first operation option in the first operation interface.

The content input interface includes at least one input option.

Figure 4:
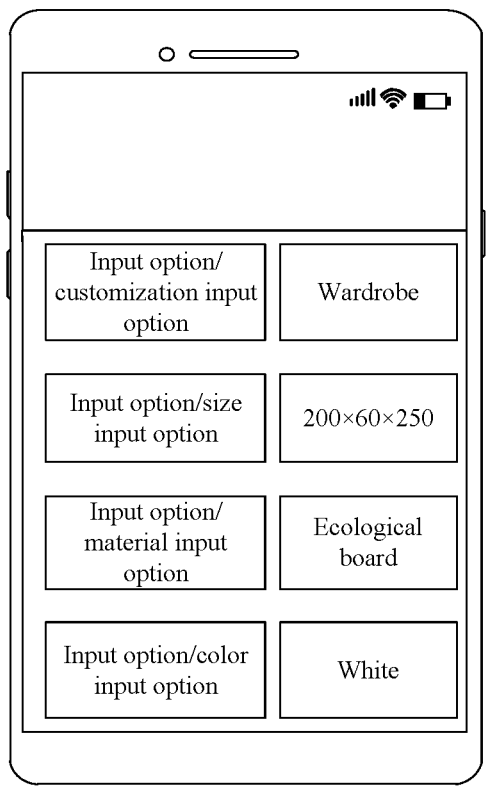
FIG. 4 is a schematic diagram of another display interface according to the present disclosure.

For example, FIG. 4 is a schematic diagram of another display interface according to the present disclosure. Based on the above embodiment, the user completes an operation on the deposit confirming option, and the content input interface as shown in FIG. 4 is displayed in response to the user completing the operation on the deposit confirming option in the first operation interface. The content input interface includes at least one input option. For example, in a scenario where a user desires whole house customization, after the user gives a deposit for the whole house customization, the merchant is required to complete on-site measurements based on customization demands of the user, complete designs, and then determine customized products. A customization input option for the whole house customization may be displayed on the content input interface. As shown in FIG. 4, the merchant inputs, in the customization input option, content that indicates whether the user wants to customize a wardrobe, a cabinet, a bookcase, a bed or the like. A size input option may further be displayed on the content input interface. As shown in FIG. 4, the merchants inputs a length, a width, and a height of each customized product in the size input option. A material input option may further be displayed on the content input interface. As shown in FIG. 4, the merchant inputs, in the material input option, content that indicates which one of a density board, a multi-layer board, solid wood or an ecological board is used for producing each customized product. Other input options may further be displayed on the content input interface, which will not be listed herein.

In step S105, in response to content inputted in the at least one input option, a second target value is determined and a second operation control corresponding to a second stage for the target object is generated.

Figure 5:
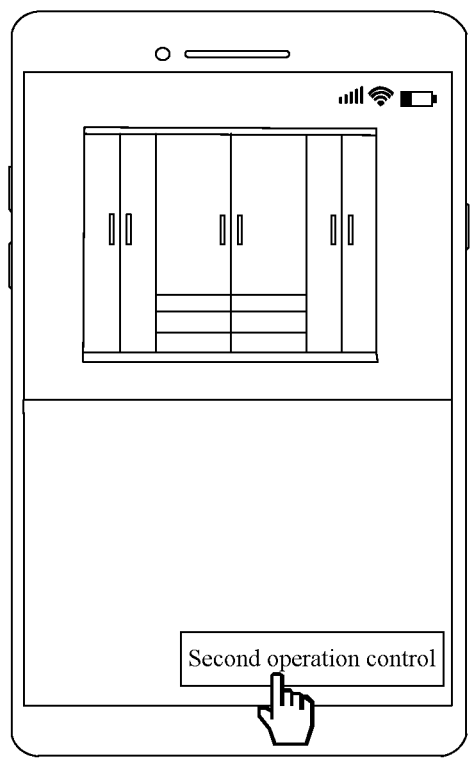
FIG. 5 is a schematic diagram of another display interface according to the present disclosure.

For example, FIG. 5 is a schematic diagram of another display interface according to the present disclosure. The merchant inputs content in various input options on the content input interface. In response to the completion of the content inputted in the input options, the second target value is determined, and the target object enters the second stage. The second operation control as shown in FIG. 5 is generated. For example, based on the above embodiment, the user desires to customize a wardrobe. After the user gives a deposit, the merchant performs on-site measurements to determine the size of the wardrobe, and determines the ecological board as a material for producing the wardrobe according to requirements of the user. Therefore, "wardrobe", "200*60*250" and "ecological board" are inputted in the at least one input option on the content input interface, as shown in FIG. 4. Based on the inputted information, a customized product required by the user is generated and a balance of the wardrobe is determined.

In step S107, a second operation interface is displayed in response to triggering the second operation control.

The second operation interface includes at least one second operation option. The at least one second operation option corresponds to the second target value.

Figure 6:
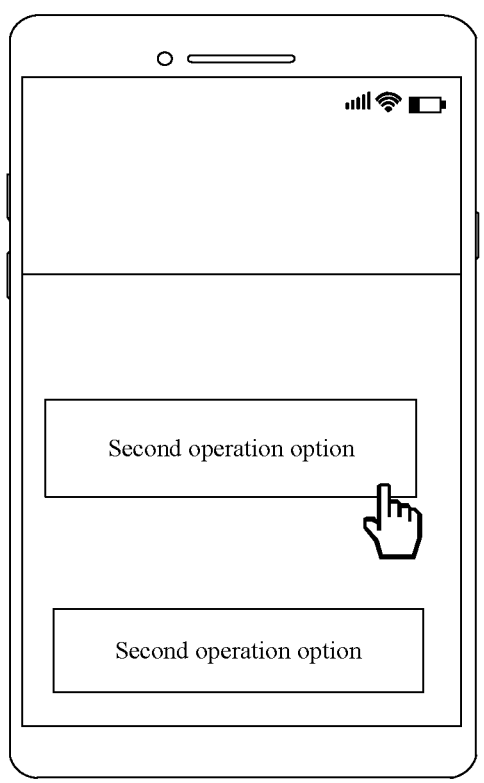
FIG. 6 is a schematic diagram of another display interface according to the present disclosure.

For example, FIG. 6 is a schematic diagram of another display interface according to the present disclosure. After the second target value is determined, the user triggers the second operation control as shown in FIG. 5 in the second stage for the target object and the second operation interface as shown in FIG. 6 is displayed in response to triggering the second operation control. At least one second operation option is displayed on the second operation interface. The at least one second operation option includes a balance confirming option and a balance canceling option. If the user completes an operation on the balance canceling option, the target object is disabled and the process of obtaining the customized product is terminated. If the user completes an operation on the balance confirming option, the user can obtain the customized product.

In step S109, a state of the target object is updated to a completed state in response to a completion of an operation on the at least one second operation option in the second operation interface.

For example, based on the above embodiments, the user completes an operation on the balance confirming option, and the state of the target object is updated to the completed state in response to the user completing the operation on the balance confirming option in the second operation interface. That is, the process of obtaining the customized product by the user is completed, and the user is enabled to obtain the customized product.

In the technical solutions according to the present disclosure, the first operation interface is displayed in response to triggering the first operation control in the first stage for the target object. The first operation interface includes at least one first operation option corresponding to the first target value. The content input interface is displayed in response to completing an operation on the at least one operation option in the first operation interface. In response to a completion of the content inputted in the at least one input option in the content input interface, the second target value is determined and the second operation control corresponding to the second stage for the target object is generated. The second operation interface is displayed in response to triggering the second operation control. The second operation interface includes at least one second operation option corresponding to the second target value. The state of the target object is updated to a completed state in response to completing an operation on at least one second operation option in the second operation interface. In this way, the user completes an operation on the at least one first operation option corresponding to the first target value, to reserve the customized product corresponding to the target object. Contents inputted in the input options vary for different users, resulting in different second target values. That is, different second target values are obtained for different users. The user completes an operation on at least one second operation option corresponding to the second target value to obtain the customized product.

Figure 7:
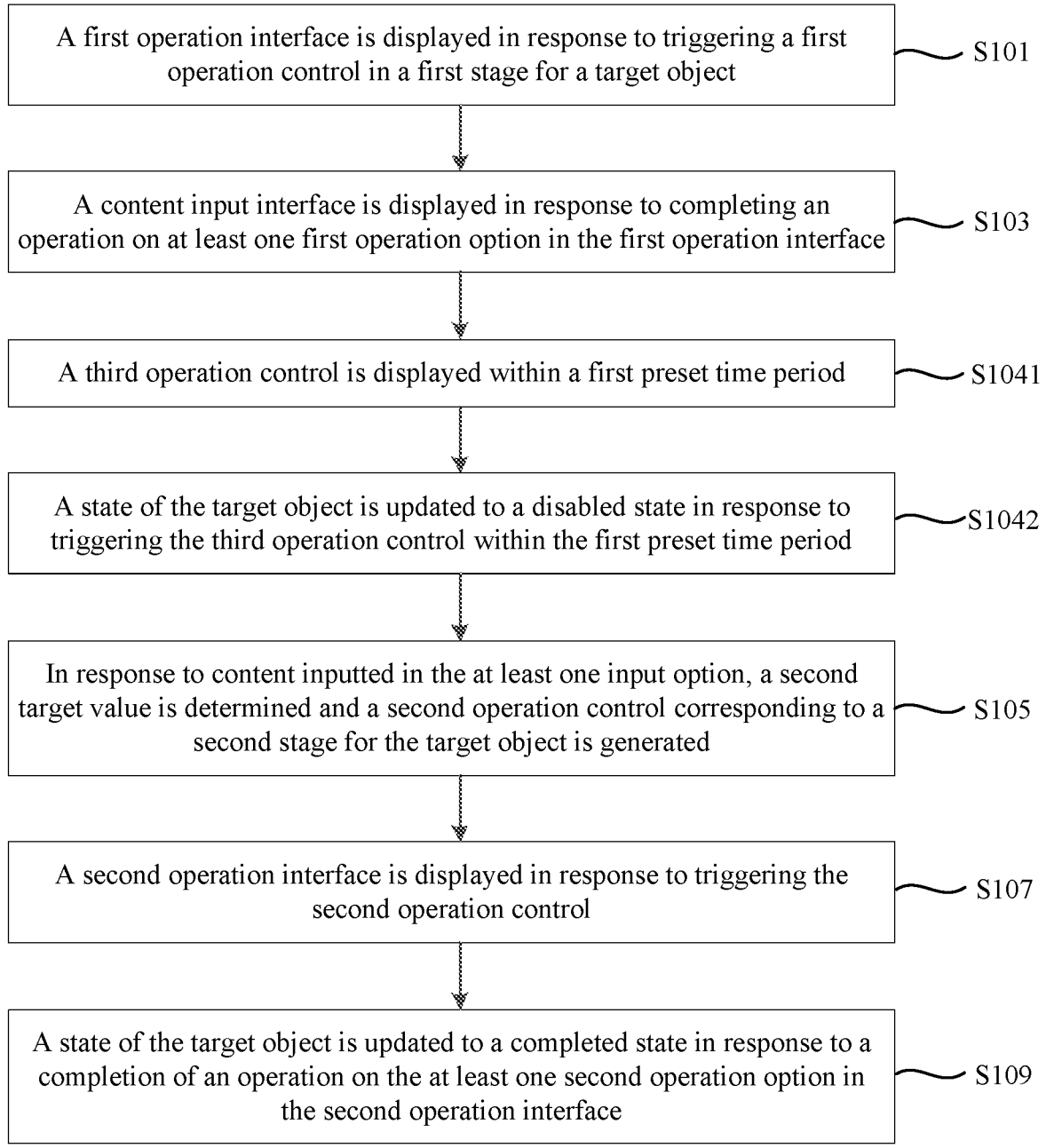
FIG. 7 is a flowchart of another object processing method according to the present disclosure.

FIG. 7 is a flowchart of another object processing method according to the present disclosure. Based on the embodiment shown in FIG. 1, the method in FIG. 7 further includes the following steps S1041 and S1042 after step S103.

In step S1041, a third operation control is displayed within a first preset time period.

Figure 8:
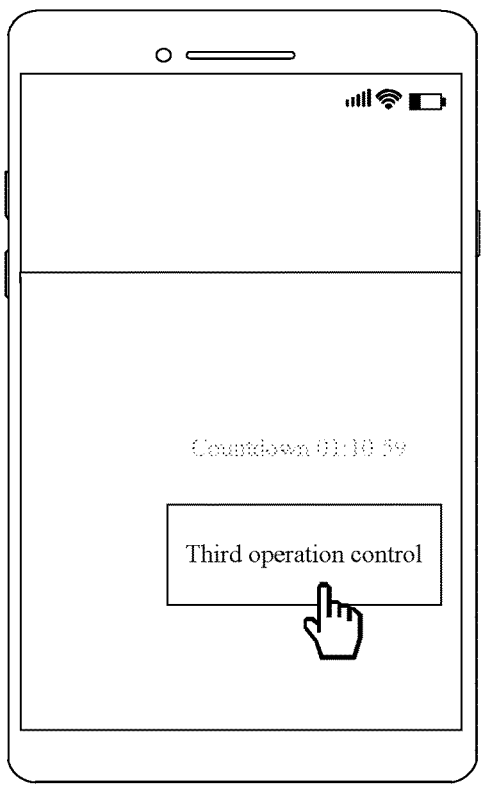
FIG. 8 is a schematic diagram of another display interface according to the present disclosure.

For example, FIG. 8 is a schematic diagram of another display interface according to the present disclosure. The interface as shown in FIG. 8 is displayed within the first preset time period after the user completes the operation on the deposit confirming option. The third operation control is displayed on the display interface. The third operation control in the present disclosure may be a control for triggering a refund.

In step S1042, a state of the target object is updated to a disabled state in response to triggering the third operation control within the first preset time period.

The user may trigger the third operation control as shown in FIG. 8 within the first preset time period after the user gives the deposit. In response to triggering the third operation control, the target object is terminated and the state of the target object is updated to the disabled state. For example, within two hours after the deposit is given, the user does not want to continue customizing the product. In this case, the user may trigger the refund control. In response to triggering the refund control by the user, the deposit is automatically returned to the user and the order is disabled.

In this embodiment, the third operation control is displayed within the first preset time period, and the state of the target object is updated to the disabled state in response to triggering the third operation control within the first preset time period. After the user calms down within the first preset time period and determines not to continue customizing the product, the user may trigger the refund operation to close the order, so that the user can consume rationally, thereby improving user experience.

Figure 9:
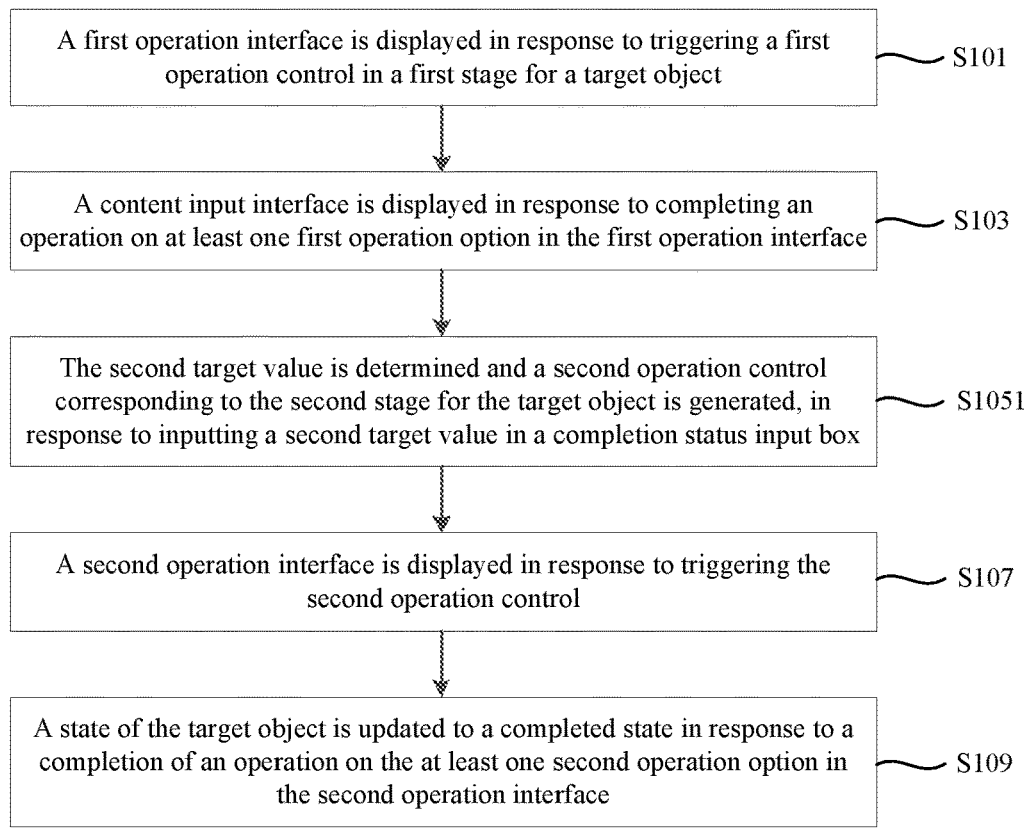
FIG. 9 is a flowchart of another object processing method according to the present disclosure.

FIG. 9 is a flowchart of another object processing method according to the present disclosure FIG. 9 is a specific description of an implementation for performing step S105, based on the embodiment shown in FIG. 1. The implementation may include the following step S1051.

In step S1051, in response to inputting a second target value in a completion status input box, the second target value is determined and a second operation control corresponding to the second stage for the target object is generated.

Figure 10:
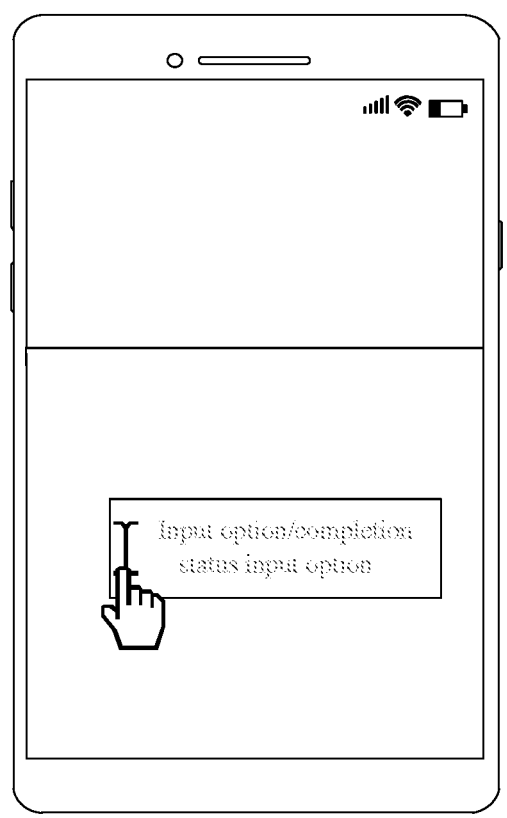
FIG. 10 is a schematic diagram of another display interface according to the present disclosure.

For example, FIG. 10 is a schematic diagram of another display interface according to the present disclosure. As shown in FIG. 10, the input option in the content input interface includes a completion status input option. For example, the completion status input option may be a completion status input box. The merchant calculates a second target value based on attributes of the customized product of the user and inputs the second target value into the completion status input box. Based on the second target value inputted by the user in the completion status input box, the second target value is determined and the second operation control as shown in FIG. 5 is generated.

For example, based on the above embodiments, the merchant determines that the user wants to customize a wardrobe that is made of an ecological board and has a size of 200*60*250. The merchant calculates a balance of 5000 based on attribute information of the customized product. The merchant inputs an amount of the balance in the completion status input box, and then the balance for customizing the wardrobe is determined to be 5000 based on the amount inputted by the merchant in the completion status input box.

In this embodiment, in response to the second target value inputted in the completion status input box, the second target value is determined and the second operation control corresponding to the second stage for the target object is generated. In this way, different second target values are inputted for different customized products, so that the user can obtain customized products with different values.

Figure 11:
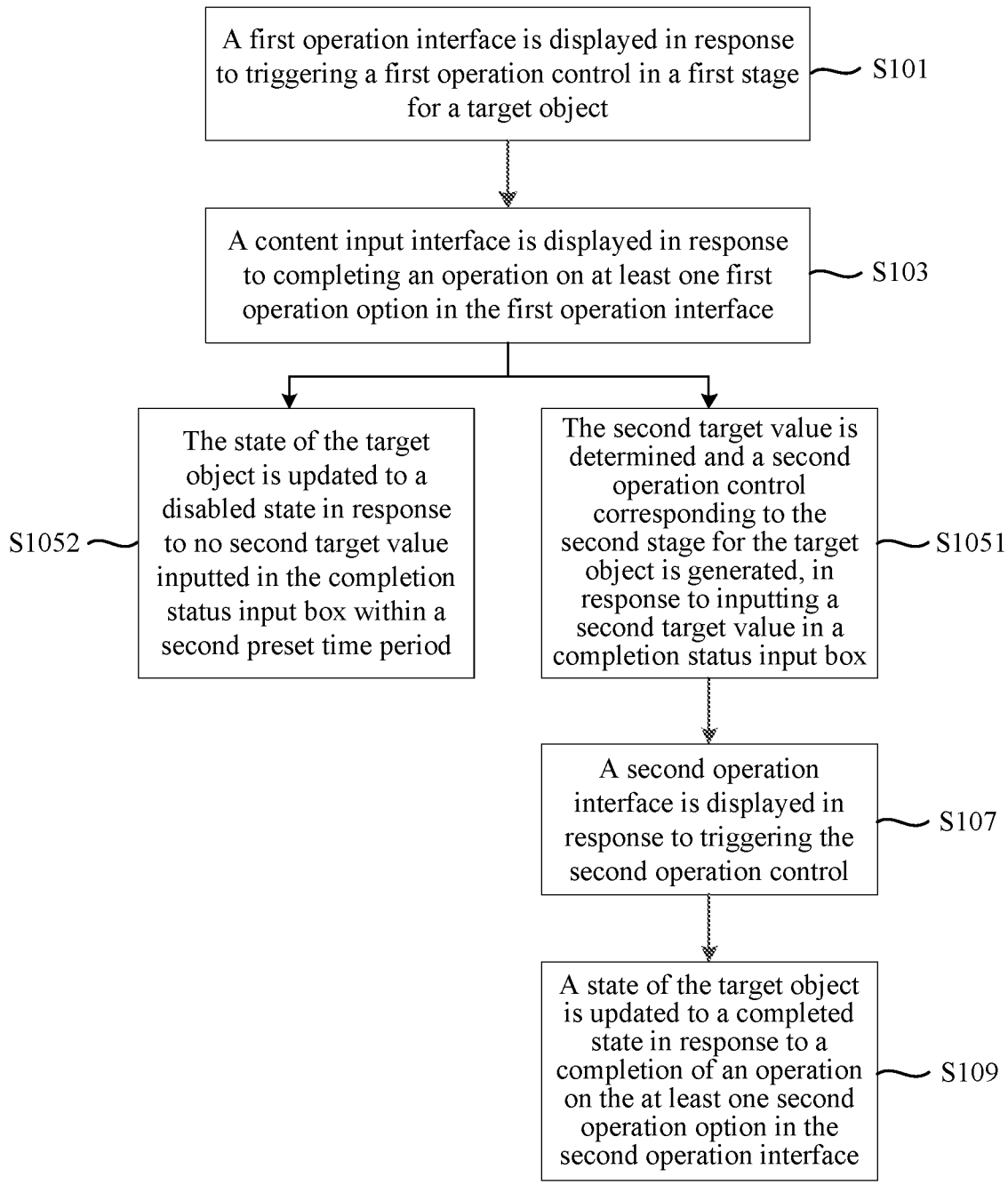
FIG. 11 is a flowchart of another object processing method according to the present disclosure.

FIG. 11 is a flowchart of another object processing method according to the present disclosure. Based on the embodiment shown in FIG. 10, the method in FIG. 11 further includes the following steps S1052.

In step S1052, the state of the target object is updated to a disabled state in response to no second target value inputted in the completion status input box within a second preset time period.

For example, based on the above embodiments, in a case that the merchant does not input the second target value in the completion status input box within the second preset time period, it indicates that the merchant is unable to provide the user with the customized products required by the user and cannot determine the second target value. In response to no second target value inputted by the merchant in the completion status input box within the second preset time period, a process of refunding the deposit is triggered. In addition, the process of obtaining the customized product by the user is terminated and the target object is disabled.

In this embodiment, the state of the target object is updated to the disabled state in response to no second target value inputted in the completion status input box within the second preset time period. In this way, in the case that the merchant cannot provide the user with the required customized product, an operation of closing the target object is automatically triggered, thereby ensuring rights and interests of users.

Figure 12:
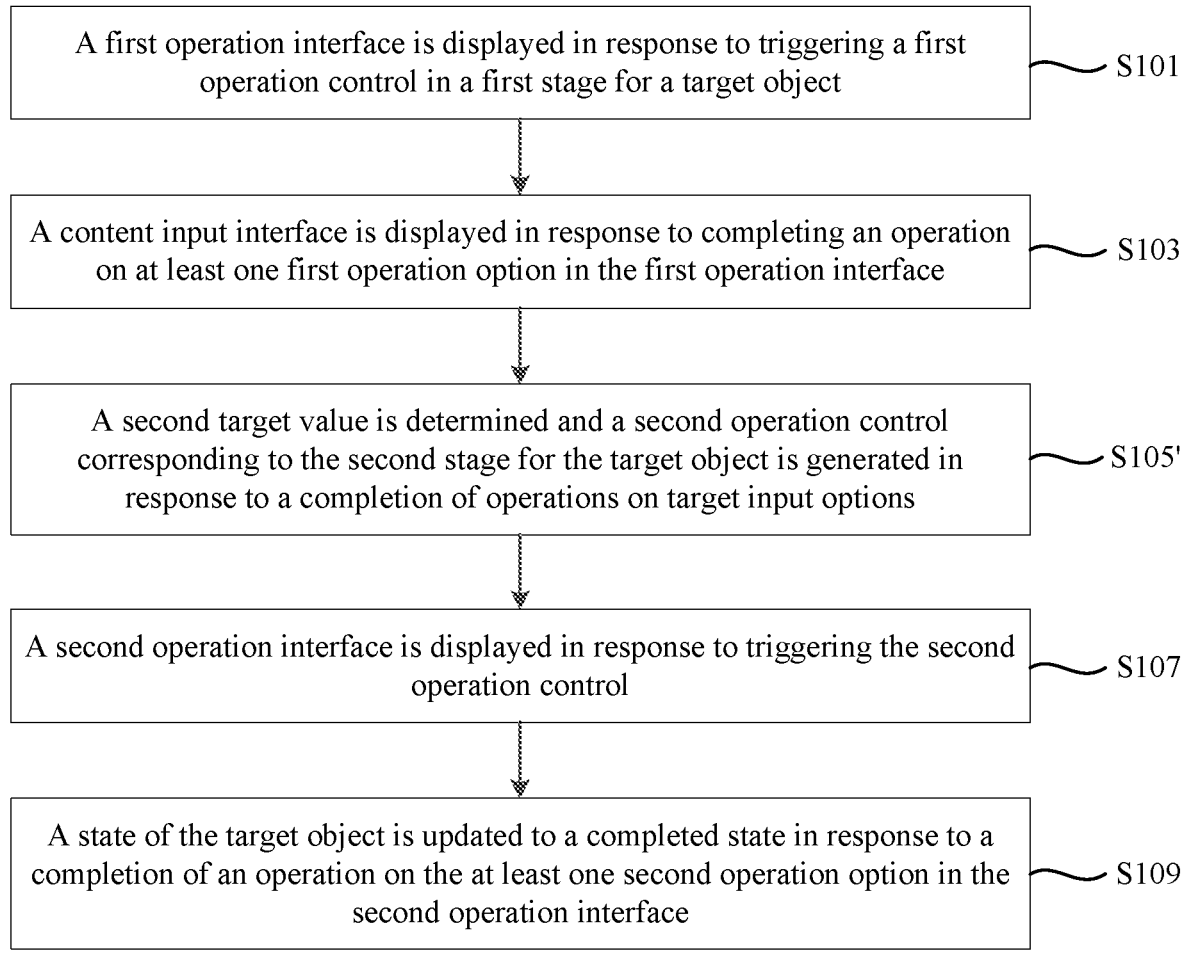
FIG. 12 is a flowchart of another object processing method according to the present disclosure.

FIG. 12 is a flowchart of another object processing method according to the present disclosure. FIG. 12 is a specific description of an implementation for performing step S105, based on the embodiment shown in FIG. 1. The implementation may include the following step S105'.

In step S105', a second target value is determined and a second operation control corresponding to the second stage for the target object is generated in response to a completion of operations on target input options.

There is a one-to-one correspondence between the target input options and sub target values. The second target value is a sum of sub target values.

The input options on the content input interface include the target input options. The target input options may be input options that affect the second target value. The sum of sub target values corresponding to respective target input options may be the second target value. For example, based on the above embodiments, the content input interface further includes a color input option for the customized wardrobe. As shown in FIG. 4, the content in the color input option does not affect a price of the customized wardrobe. Therefore, the customization input option, the size input option, and the material input option serves as target input options. The customization input option corresponds to a labor cost, the size input option corresponds to a cost of the quantity of selected material, and the material input option corresponds to a cost of a type of the selected material. The amount of balance is determined based on the sum of the three costs.

After the user inputs contents in the target input options, the second target value is determined and the second operation control as shown in FIG. 5 is generated, in response to the contents in the target input options.

In this embodiment, in response to the completion of operations on the target input option, the second target value is determined and the second operation control corresponding to the second stage for the target object is generated. In this way, the second target value can be determined based on the content inputted in the target input option that affects the second target value, without considering content inputted in the non-target input option. The second target value can be determined quickly and the efficiency of determining the second target value can be improved.

Figure 13:
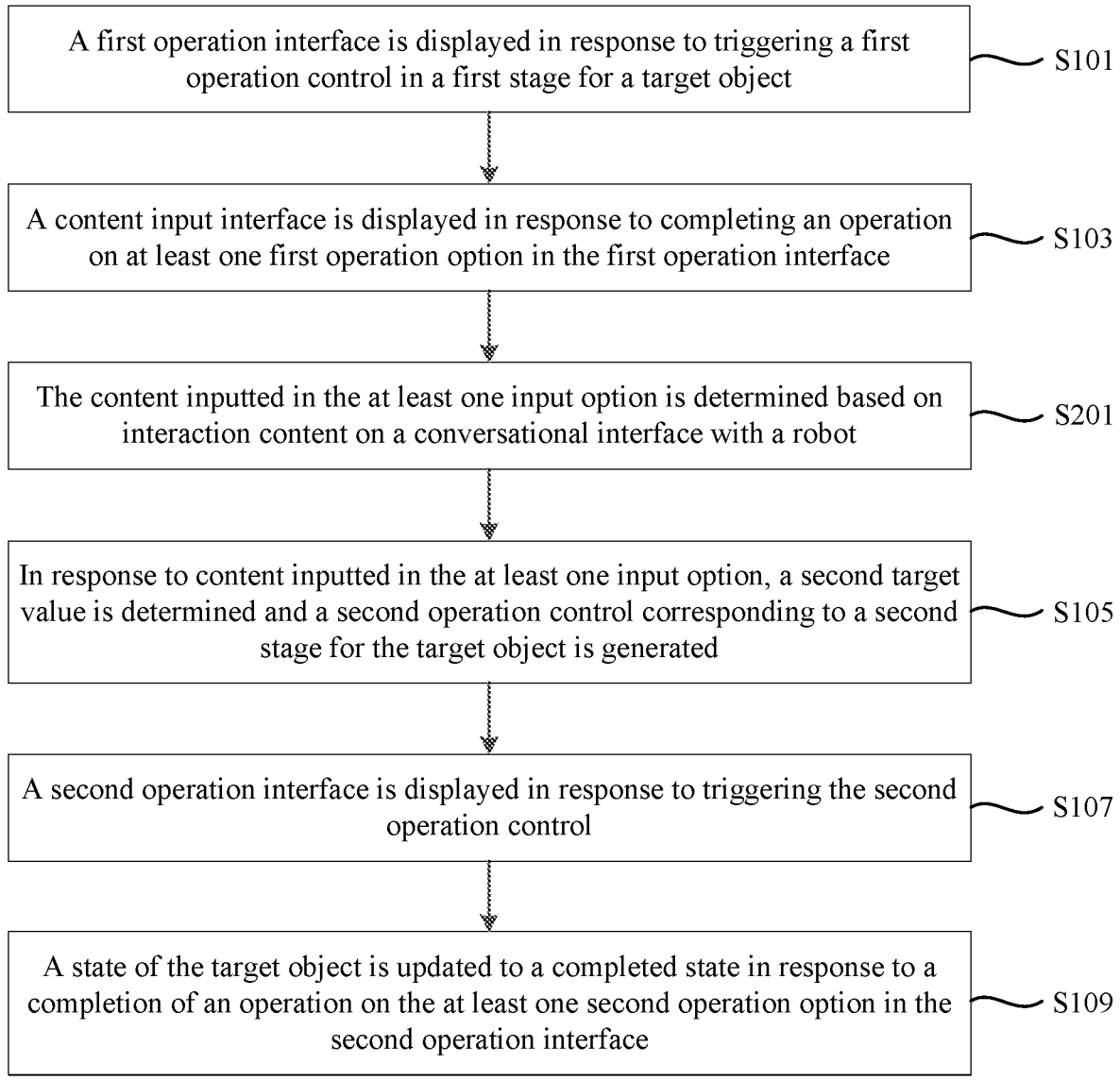
FIG. 13 is a flowchart of another object processing method according to the present disclosure.

FIG. 13 is a flowchart of another object processing method according to the present disclosure. Based on the embodiment shown in FIG. 1, the method in FIG. 13 further includes step S201 before step S105.

In step S201, the content inputted in the at least one input option is determined based on interaction content on a conversational interface with a robot.

Figure 14:
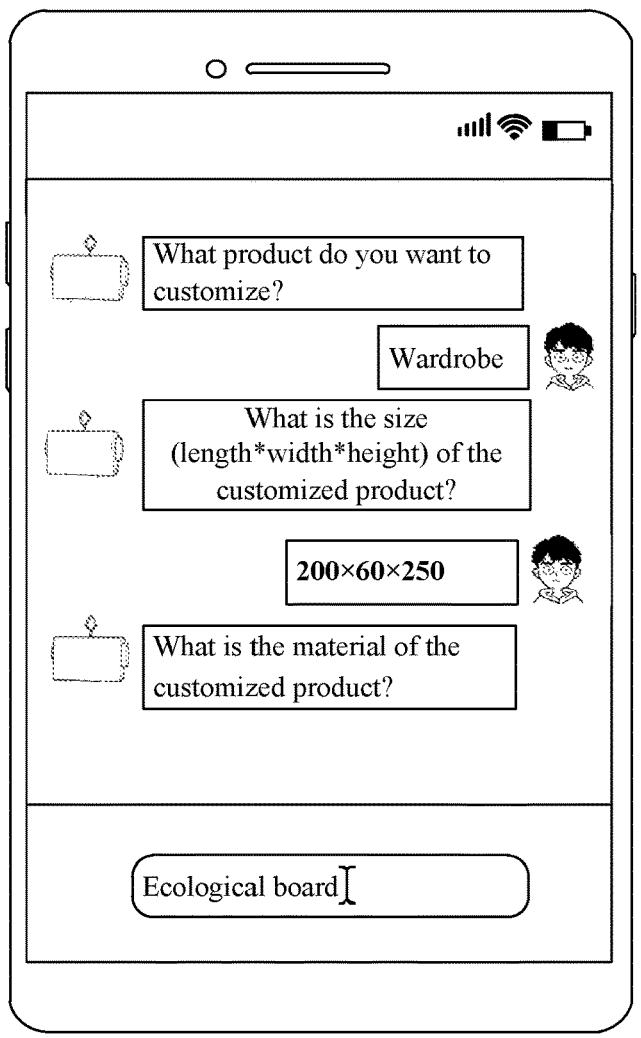
FIG. 14 is a schematic diagram of another display interface according to the present disclosure.

For example, FIG. 14 is a schematic diagram of another display interface according to the present disclosure. The content input interface is a conversational interface with a robot. As shown in FIG. 14, the robot sends interaction content to the merchant in a dialog box. The merchant responds in the dialog box, based on the interaction content sent by the robot. The content inputted in a corresponding input option is determined based on the content replied by the merchant in the dialog box. In this way, the contents inputted in all input options can be determined through multiple interactions. For example, based on the above embodiments as shown in FIG. 14, in the conversational interface with a robot, the robot sends "what product do you want to customize?" and the merchant responds with "wardrobe", so that content inputted in the customization input option is determined as wardrobe. Next, the robot sends "what is the size (length*width*height) of the customized product?" and the merchant replies with "200*60*250", so that content inputted in the size input option is determined as 200*60*250. Then, the robot sends "what is the material of the customized product?" in the dialogue interface and the merchant replies with "ecological board", so that content inputted in the material input option is ecological board. In this way, all information about the customized product is obtained.

In this embodiment, the content inputted in the at least one input option is determined based on the interaction content on the conversational interface with a robot. The content inputted in the at least one input option is obtained through dialogue with the robot, improving interactivity and enjoyment of the process of customizing a product.

Figure 15:
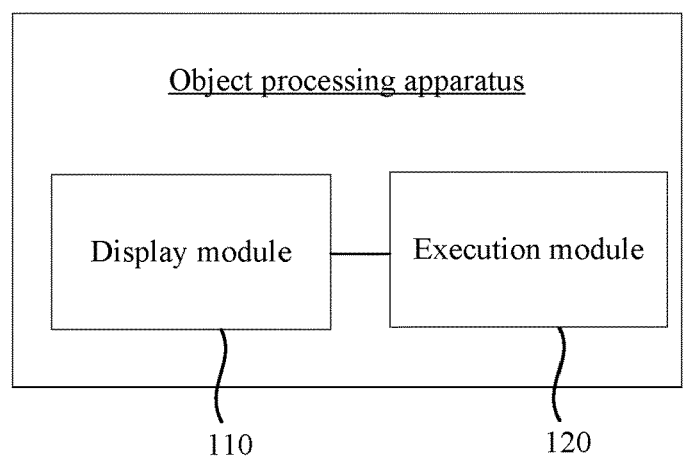
FIG. 15 is a schematic structural diagram of an object processing apparatus according to the present disclosure.

An object processing apparatus is further provided according to the present disclosure FIG. 15 is a schematic structural diagram of an object processing apparatus according to the present disclosure. As shown in FIG. 15, the object processing apparatus includes a display module 110 and an execution module 120.

The display module 110 is configured to display a first operation interface in response to triggering a first operation control in a first stage for a target object, where the first operation interface includes at least one first operation option, and the at least one first operation option corresponds to a first target value; and display a content input interface in response to completing an operation on at least one first operation option in the first operation interface, where the content input interface includes at least one input option.

The execution module 120 is configured to determine a second target value and generate a second operation control corresponding to a second stage for the target object in response to content inputted in the at least one input option.

The display module 110 is further configured to display a second operation interface in response to triggering the second operation control, where the second operation interface includes at least one second operation option, and the at least one second operation option corresponds to the second target value.

The execution module 120 is further configured to update a state of the target object to a completed state in response to completing an operation on at least one second operation option in the second operation interface.

In an embodiment, the display module 110 is further configured to display a third operation control within a first preset time period.

The execution module 120 is further configured to update the state of the target object to a disabled state in response to triggering the third operation control within the first preset time period.

In an embodiment, the execute module 120 is further configured to determine the second target value and generate the second operation control corresponding to a second stage for the target object, in response to inputting the second target value in a completion status input box.

In an embodiment, the execution module 120 is further configured to update the state of the target object to the disabled state in response to no second target value inputted in the completion status input box within a second preset time period.

In an embodiment, the content input interface is a conversational interface with a robot.

The execution module 120 is further configured to determine the content inputted in the at least one input option based on interaction content on the conversational interface with the robot.

In an embodiment, the execute module 120 is further configured to determine a second target value and generate a second operation control corresponding to a second stage for the target object, in response to a completion of operations on target input options, where there is a one-to-one correspondence between the target input options and sub target values, and the second target value is a sum of sub target values.

The apparatus according to this embodiment may be applied to perform the method in the above embodiments. Implementation principles and technical effects of the apparatus are similar to those of the method, which will not be repeated herein.

An electronic device is further provided according to the present disclosure. The electronic device includes a processor. The processor is configured to execute a computer program stored in a memory. The computer program, when executed by the processor, causes the processor to implement the method according to the above embodiments.

A computer-readable storage medium is further provided according to the present disclosure. The computer-readable storage medium stores a computer program. The computer program, when executed by a processor, causes the processor to implement method according to the above embodiments.

A computer program product is further provided according to the present disclosure. The computer program product, when running on a computer, causes the computer to implement the method according to the above embodiments.

It should be noted that in the present disclosure, relational terms such as "first" and "second" are only used to distinguish one entity or operation from another entity or operation, but do not indicate or imply an actual relationship or order of these entities or operations. Further, the terms "include", "comprise" or any variant thereof are intended to encompass nonexclusive inclusion so that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

The above are only specific implementations of the present disclosure, such that those skilled in the art can understand or implement the present disclosure. It is apparent for those skilled in the art to make many modifications to these embodiments. The general principle defined herein may be applied to other embodiments without departing from spirit or scope of the present disclosure. Therefore, the present disclosure is not limited to the embodiments disclosed herein, but is to conform to the widest scope in accordance with the principle and novel features disclosed herein.

The invention claimed is:

1. An object processing method, comprising:
    displaying a first operation interface in response to triggering a first operation control corresponding to a target object, wherein the first operation interface comprises a first operation option, and the first operation option corresponds to a first target value;
    displaying a content input interface in response to completing an operation on the first operation option in the first operation interface, wherein the content input interface comprises at least one input option;
    determining a second target value and generating a second operation control corresponding to the target object, in response to content inputted in the at least one input option;
    displaying a second operation interface in response to triggering the second operation control, wherein the second operation interface comprises at least one second operation option, and the at least one second operation option corresponds to the second target value; and
    updating a state of the target object to a completed state in response to completing an operation on the at least one second operation option on the second operation interface,
    wherein after the displaying the content input interface in response to completing the operation on the first operation option in the first operation interface, the method further comprises:
    displaying a third operation control within a first preset time period; and
    updating the state of the target object to a disabled state, in response to triggering the third operation control within the first preset time period.

2. The method according to claim 1, wherein the determining the second target value and generating the second operation control corresponding to the target object in response to the content inputted in the at least one input option comprises:
    determining the second target value and generating the second operation control corresponding to the target object, in response to inputting the second target value in a completion status input box.

3. The method according to claim 2, further comprising:
    updating the state of the target object to a disabled state, in response to no second target value inputted in the completion status input box within a second preset time period.

4. The method according to claim 1, wherein the content input interface is a conversational interface, and the method further comprises:
    determining the content inputted in the at least one input option based on interaction content on the conversational interface.

5. The method according to claim 1, wherein the determining the second target value and generating the second operation control corresponding to the target object in response to the completion of the content inputted in the at least one input option comprises:
    determining the second target value and generating the second operation control corresponding to the target object, in response to contents inputted in a target input options, wherein there is a one-to-one correspondence between the target input options and sub target values, and the second target value is a sum of sub target values.

6. An electronic device, comprising:
    a processor configured to execute a computer program stored in a memory,
    wherein the computer program, when executed by the processor, causes the processor to:

display a first operation interface in response to triggering a first operation control corresponding to a target object, wherein the first operation interface comprises a first operation option, and the first operation option corresponds to a first target value;

display a content input interface in response to completing an operation on the first operation option in the first operation interface, wherein the content input interface comprises at least one input option;

determine a second target value and generate a second operation control corresponding to the target object, in response to content inputted in the at least one input option;

display a second operation interface in response to triggering the second operation control, wherein the second operation interface comprises at least one second operation option, and the at least one second operation option corresponds to the second target value;

update a state of the target object to a completed state in response to completing an operation on the at least one second operation option on the second operation interface;

display a third operation control within a first preset time period, after the content input interface is displayed in response to completing the operation on the first operation option in the first operation interface; and update the state of the target object to a disabled state, in response to triggering the third operation control within the first preset time period.

7. The electronic device according to claim 6, wherein the computer program, when executed by the processor, causes the processor to:

determine the second target value and generate the second operation control corresponding to the target object, in response to inputting the second target value in a completion status input box.

8. The electronic device according to claim 7, wherein the computer program, when executed by the processor, causes the processor further to:

update the state of the target object to a disabled state, in response to no second target value inputted in the completion status input box within a second preset time period.

9. The electronic device according to claim 6, wherein the content input interface is a conversational interface, and the computer program, when executed by the processor, causes the processor to:

determine the content inputted in the at least one input option based on interaction content on the conversational interface.

10. The electronic device according to claim 6, wherein the computer program, when executed by the processor, causes the processor to:

determine the second target value and generate the second operation control corresponding to the target object, in response to contents inputted in a target input options, wherein there is a one-to-one correspondence between the target input options and sub target values, and the second target value is a sum of sub target values.

11. A non-transitory computer-readable storage medium, wherein the non-transitory computer-readable storage medium stores a computer program; and the computer program, when executed by a processor, causes the processor to:

display a first operation interface in response to triggering a first operation control corresponding to a target object, wherein the first operation interface comprises a first operation option, and the first operation option corresponds to a first target value;

display a content input interface in response to completing an operation on the first operation option in the first operation interface, wherein the content input interface comprises at least one input option;

determine a second target value and generate a second operation control corresponding to the target object, in response to content inputted in the at least one input option;

display a second operation interface in response to triggering the second operation control, wherein the second operation interface comprises at least one second operation option, and the at least one second operation option corresponds to the second target value;

update a state of the target object to a completed state in response to completing an operation on the at least one second operation option on the second operation interface;

display a third operation control within a first preset time period, after the content input interface is displayed in response to completing the operation on the first operation option in the first operation interface; and update the state of the target object to a disabled state, in response to triggering the third operation control within the first preset time period.

12. The non-transitory computer-readable storage medium according to claim 11, wherein the computer program, when executed by the processor, causes the processor to:

determine the second target value and generate the second operation control corresponding to the target object, in response to inputting the second target value in a completion status input box.

13. The non-transitory computer-readable storage medium according to claim 12, wherein the computer program, when executed by the processor, causes the processor further to:

update the state of the target object to a disabled state, in response to no second target value inputted in the completion status input box within a second preset time period.

14. The non-transitory computer-readable storage medium according to claim 11, wherein the content input interface is a conversational interface, and the computer program, when executed by the processor, causes the processor to:

determine the content inputted in the at least one input option based on interaction content on the conversational interface.

15. The non-transitory computer-readable storage medium according to claim 11, wherein the computer program, when executed by the processor, causes the processor to:

determine the second target value and generate the second operation control corresponding to the target object, in response to contents inputted in a target input options, wherein there is a one-to-one correspondence between the target input options and sub target values, and the second target value is a sum of sub target values.

* * * * *